United States Patent
Ngo et al.

(10) Patent No.: US 8,850,341 B2
(45) Date of Patent: Sep. 30, 2014

(54) MAKING ADDRESS BOOK A SOURCE OF LATITUDE AND LONGITUDE COORDINATES

(75) Inventors: Ngoc Bich Ngo, Kanata (CA); David Paul Yach, Waterloo (CA)

(73) Assignee: Blackberry Limited, Waterloo, Ontario (CA)

( * ) Notice: Subject to any disclaimer, the term of this patent is extended or adjusted under 35 U.S.C. 154(b) by 738 days.

(21) Appl. No.: 12/511,418

(22) Filed: Jul. 29, 2009

(65) Prior Publication Data

US 2011/0029900 A1 Feb. 3, 2011

(51) Int. Cl.
- G01C 21/00 (2006.01)
- G06F 17/30 (2006.01)
- G06F 15/16 (2006.01)
- G06F 3/048 (2013.01)
- H04M 1/725 (2006.01)
- H04M 1/2745 (2006.01)
- G01C 21/20 (2006.01)

(52) U.S. Cl.
CPC ..... *G06F 17/30241* (2013.01); *H04M 1/72572* (2013.01); *H04M 1/274516* (2013.01); *H04M 1/274508* (2013.01); *G01C 21/20* (2013.01)
USPC .......................................... 715/764; 701/208

(58) Field of Classification Search
USPC ....................................................... 715/764
See application file for complete search history.

(56) References Cited

U.S. PATENT DOCUMENTS

| | | | |
|---|---|---|---|
| 7,043,362 B2 | 5/2006 | Krull et al. | |
| 7,376,636 B1 | 5/2008 | Wang et al. | |
| 2003/0004776 A1* | 1/2003 | Perrella et al. | 705/9 |
| 2003/0034879 A1* | 2/2003 | Rangarajan et al. | 340/7.56 |
| 2005/0114021 A1* | 5/2005 | Krull et al. | 701/211 |
| 2007/0285227 A1* | 12/2007 | Timothy et al. | 340/539.13 |
| 2008/0280600 A1 | 11/2008 | Zhou | |
| 2009/0241046 A1* | 9/2009 | Nielsen et al. | 715/764 |
| 2010/0153465 A1* | 6/2010 | Dasgupta | 707/802 |

FOREIGN PATENT DOCUMENTS

| | | |
|---|---|---|
| EP | 1840523 | 10/2007 |
| WO | WO 01/13069 A1 | 2/2001 |

OTHER PUBLICATIONS

European Search Report dated Nov. 30, 2009 for European Application No. 09166725.
Skylab Mobilesystems, ContactMapper User Manual Version 1.0, Printed on Mar. 16, 2009, pp. 1 to 13, http://skylab-mobilesystems.com.
How to Program Google Android; Dec. 15, 2008; pp. 1 to 13; http://blogoscoped.com/archive/2008-12-15-n14.html.
Published by Bruce, Add A Geo Field to iPhone and Address Book, Feb. 9, 2009, pp. 1 to 8, http://www.bioneural.net/2009/02/09/add-a-geo-field-to-iphone-and-address-book/#more-1379.

(Continued)

Primary Examiner — Peiyong Weng

(57) ABSTRACT

A method for determining latitude and longitude coordinates for geographic addresses input into an address book on a mobile device is provided. For each geographic address received for storing in a contact record, latitude and longitude coordinates are automatically determined and associated with the geographic address in a database of contact records. In some embodiments, for each geographic address to be input, the method first searches existing contact records for the geographic address and if the latitude and longitude coordinates for the geographic address are in an existing contact record, the contact record for the contact is cross-referenced to the existing record for accessing the latitude and longitude coordinates.

17 Claims, 6 Drawing Sheets

(56) References Cited

OTHER PUBLICATIONS

MapaList: Map Address List on Top of a Map, printed on Mar. 16, 2009; pp. 2 and 3; http://www.makeuseof.com/dir/mapalist-map-address-list-google-map/.

Phillip Holmstrand; Map Multiple Locations / Find Address Coordinates; printed on Mar. 16, 2009, pp. 1 to 4; http://www.batchgeocode.com/.

Phillip Hornby; Garmin .GPX File Creation Made Easy Using GeePeeEX Editor; Feb. 2007; http://geepeex.goodlepages.com/geepeex_2.

* cited by examiner

MAKING ADDRESS BOOK A SOURCE OF LATITUDE AND LONGITUDE COORDINATES

TECHNICAL FIELD

This application is related to a method and device for automatically determining latitude and longitude coordinates for a geographic address input into a mobile device for storing in a contact record of an address book.

BACKGROUND

Some mobile devices have map applications loaded on the devices. Map applications can be used to show a specific location on a map or to show the location of the mobile device, if the device is equipped with a position broadcast system, such as GPS (Global Positioning System). In some systems, map applications can be used to show the locations of one or more other mobile devices that are members of a group that participate in location sharing. Some map applications allow the user to designate one or more locations as Points of Interest (POIs). For some map applications, these POIs are considered "favourites" which could be shown on the map each time the respective area is displayed or shared with other map users or simply stored for sub-sequent display on-demand without having to go through the geo-coding process again.

Likewise, many mobile devices also have address book applications stored thereon. Addresses and contact information are represented in the address book application as address cards. Users can open a new address card for a new contact or update existing address cards with new or changed information. In some applications, address books on mobile devices can be updated by importing data from an external source such as an address book on a personal computer, a database on a personal computer or server, a business card scanner, or an SD (Secure Digital) card.

In some mobile devices, a user can chose to view an address from the address book on a map. When a user selects an option to view an address on a map, the map application sends a request to a server, such as a location server, to obtain geo-coded information for the respective address. The geo-coded information comprises the latitude and longitude of the address which is used by the map application to show the address on a map.

BRIEF DESCRIPTION OF THE DRAWINGS

Examples of embodiments will now be described in greater detail with reference to the accompanying drawings, in which.

DETAILED DESCRIPTION

Figure 1:
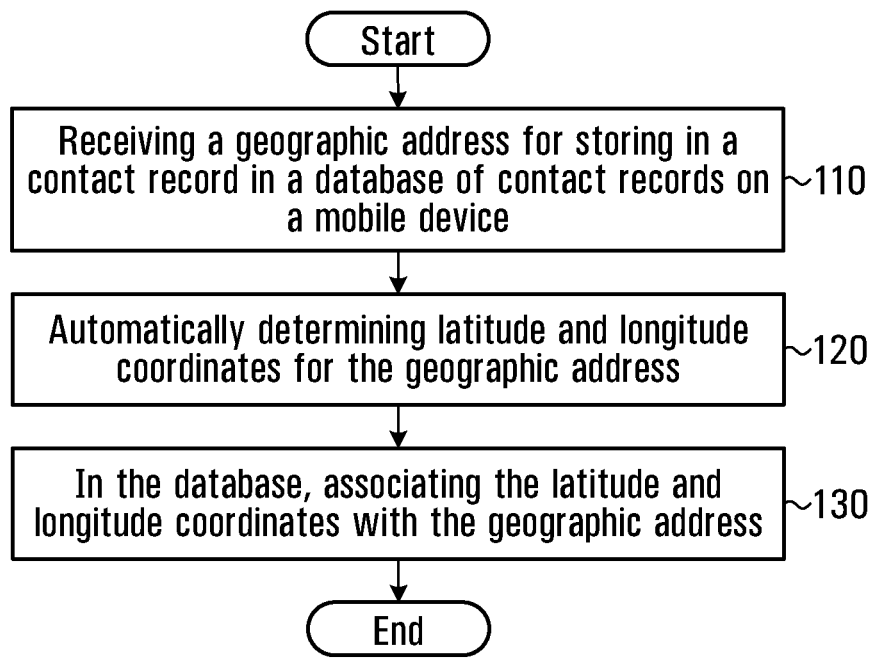
FIG. 1 is a flowchart of a method according to an aspect.

In some mobile devices, a map client or application can be invoked from a contact record in an address book application. In some situations, if a geographic address (e.g. work or home civic address) has been entered into the address book, a two-step approach is implemented:

1) upon selection of "view work map" or "view home map" or any other option to view a location of a geographic address on a map, a first request is sent to a location server to geo-code the geographic address into latitude/longitude coordinates; and 2) based on the latitude/longitude coordinates obtained from the location server, a request for map data is then sent to the map server to obtain map data for that location.

In the above approach, the geographic address must be geo-coded (for example, converted to latitude and longitude coordinates) every time the user wants to see the physical location of the address displayed overtop of a map. Considering that maps of contacts are likely to be viewed frequently, this makes the approach inefficient and time consuming.

Geo-coding may be a process of obtaining or finding associated geographic information based on other geographic data, such as a street address, place name or postal code. Associated geographic information may be, but is not limited to, latitude and longitude coordinates.

Another approach is to geo-code contact addresses upon entry into the mobile device to avoid geo-coding in real time and repeated geo-coding requests to the server, such as every time "view work map" or "view home map" is invoked. This approach results in less geo-coding requests and, therefore, less use of network resources. Another result is better performance when viewing locations of addresses from the address book. For example, because the address is already geo-coded, when the user chooses to view the location on a map, the map application simply accesses the geo-coded information from an internal memory on the mobile device, which takes less time than making a geo-coding request to a location or geo-code server.

The geo-coding of addresses upon entry on the mobile device can be done automatically or interactively. Also, in some embodiments, an option in the Address Book application is provided for the user to batch geo-code all of the contact addresses on the device at once, in a single geo-coding request.

In some embodiments, if the address is not an address recognised by the location server as a valid address, the location server will provide suggestions to the mobile device for possible corrections to the address. The mobile device can then present the suggestions on a user interface for selection by a user. The address selected by the user can then be geo-coded. Furthermore, the address selected by the user can be used to replace the invalid address in the address book, thus providing a corrected entry in the address book. This correction of addresses can be done with automatic geo-coding when the address is entered or with batch geo-coding.

In some embodiments, the address book can then be used as a geo-data source which can be registered with the map application. Contacts that have been geo-tagged can be treated as a class of POIs (points of interest) and thus, they can be viewed and navigated on the map. In an exemplary implementation, if the mobile device is enabled with a position broadcast system, such as GPS (Global Positioning System), the mobile device can notify the user if the mobile device is within a specified proximity of one or more of the contacts.

Some business/address card scanners and address export programs can introduce errors in parsing or automatically append default data, such as United States of America at the end of every address regardless of whether the address is an US address or not. A batch geo-coding utility can automatically correct these addresses based on the results returned from the server.

A map application can store geo-coded data as a layer. Each layer represents a class of information or a collection of data items having something in common. A layer might be a type of map data, such as streets or bodies of water. A layer might be a collection of business locations. Thus, the geo-coded contacts in an address book can also be represented as a layer.

In some embodiments, the geo-coded data or a subset of geo-coded data in the address book is stored in memory outside of the address book but accessible to the map application. In other embodiments, the map application is configured to access the address book database directly.

Accordingly, in one aspect, there is provided a method, in a mobile device, the method comprising: receiving a geographic address for storing in a contact record of a database of contact records on the mobile device; automatically determining latitude and longitude coordinates for the geographic address; and in the database, associating the latitude and longitude coordinates with the geographic address.

In another aspect, there is provided a mobile device comprising: a user interface configured to receive a geographic address for storing in a contact record of a database of contact records on the mobile device; a memory for storing the database; a look up component configured to automatically determine the latitude and longitude coordinates for the geographic address upon receipt of the geographic address and associate the latitude and longitude coordinates with the geographic address in the database.

In another aspect, there is provided a system comprising a mobile device and a location server, the mobile device comprising: a user interface configured to receive a geographic address for storing in a contact record of a database of contact records on the mobile device; a lookup component configured to communicate with the location server to request and receive latitude and longitude coordinates for the geographic address from the location server; and a memory configured to store the latitude and longitude coordinates for the geographic address, wherein the lookup component is configured to associate the latitude and longitude coordinates in the memory with the geographic address, and the location server comprising: an input configured to receive the request from the lookup component; a processor configured to determine the latitude and longitude coordinates for the geographic address using a location database; an output configured to output the latitude and longitude coordinates to the lookup component.

In another aspect, there is provided a method, in a mobile device, the method comprising: receiving a geographic address for a contact as an input to an address book application on the mobile device; if the geographic address is unique to the contact in the address book database on the mobile device: automatically requesting a latitude and a longitude associated with the geographic address from a location server, external to the mobile device; receiving the latitude and the longitude associated with the geographic address from the location server; storing the latitude and the longitude associated with the geographic address in a memory on the mobile device; and associating the latitude and longitude coordinates in the memory with the geographic address.

In another embodiment, if the geographic address appears in an existing contact record for a different contact and the existing contact record includes the latitude and the longitude for the geographic address, the contact record for the contact is cross-referenced to the existing contact record for accessing the latitude and the longitude.

Referring now to FIG. 1, a method according to one embodiment will now be described. At step 110 a geographic address is received for storing in a contact record of a database of contact records on the mobile device. The database of contact records, in some embodiments, is part of an address book application executing on a mobile device. At step 120, the latitude and longitude coordinates for the geographic address are automatically determined. In the database, at step 130, the latitude and longitude coordinates are associated with the geographic address.

In some embodiments, the method further comprises storing the latitude and longitude coordinates for the geographic address in the database. In some cases, this is only done if the geographic address is not already stored in the database. For example, in some embodiments, determining the latitude and longitude coordinates comprises first searching existing contact records in the database of contact records for the geographic address and if the latitude and longitude coordinates for the geographic address are in an existing contact record, cross-referencing the contact record to the existing contact record for accessing the latitude and longitude coordinates.

In some embodiments, determining the latitude and longitude coordinates comprises requesting the latitude and longitude coordinates from a location database. In some embodiments, the location database is on a location server and determining the latitude and longitude coordinates comprises requesting the longitude and latitude coordinates from a location server over a wireless network.

The method, in some embodiments, further comprises displaying a location the geographic address on a map using a map application executing on the mobile device. In some embodiments, a user perceptible alert is produced to indicate that the mobile device is within a specified proximity of the geographic address.

Figure 2:
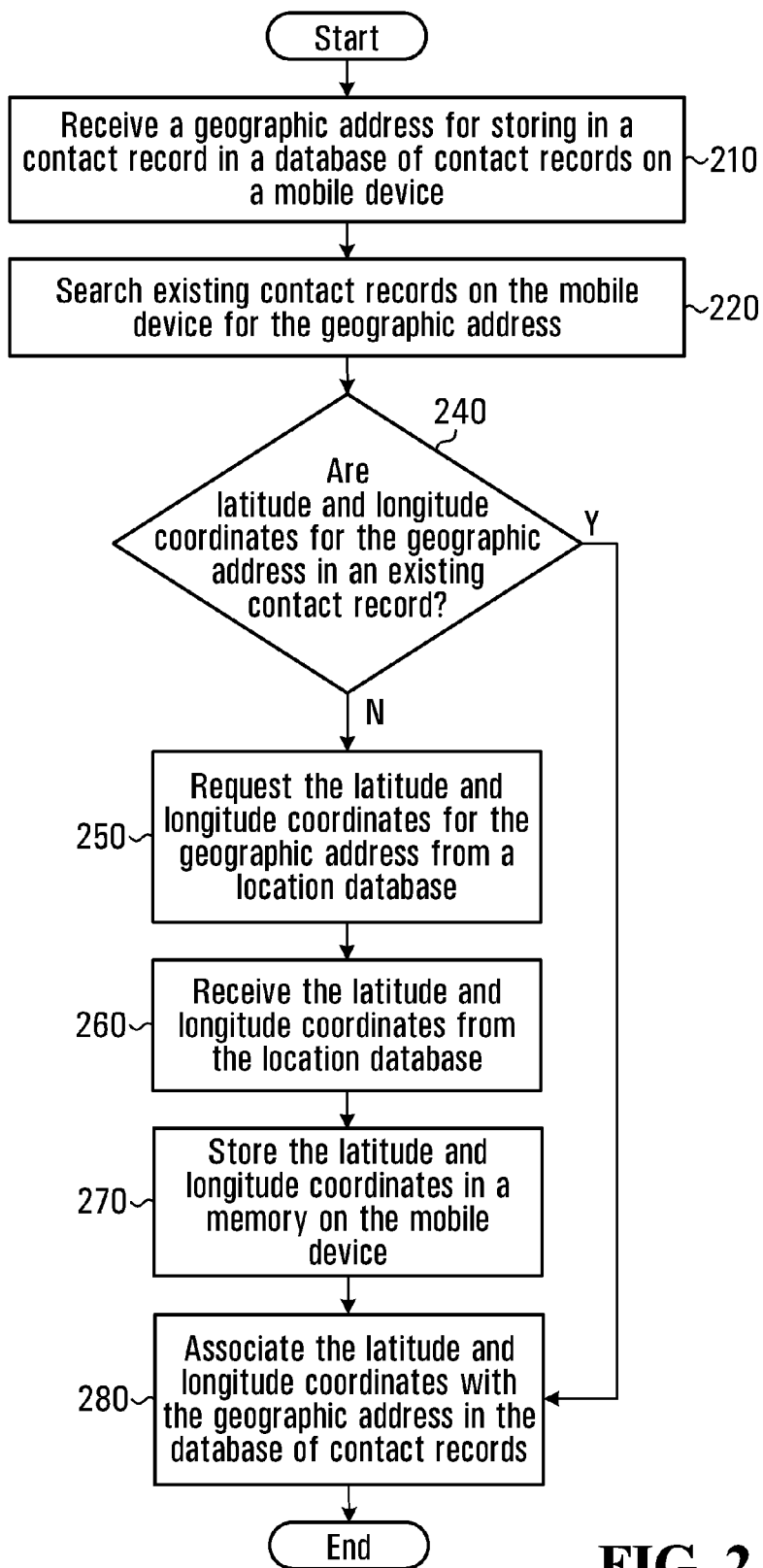
FIG. 2 is a flowchart of a method according to an aspect.

Another exemplary method will now be described with reference to FIG. 2. At step 210, a geographic address is received for storing in a contact record in a database of contact records on a mobile device. Then at step 220, existing contact records on the mobile device are searched for the geographic address. Step 240 is a determination of whether or not latitude and longitude coordinates for the geographic address are in an existing contact record. If they are not (No output of decision step 240), the method proceeds with requesting the latitude and longitude coordinates for the geographic address from a location database (Step 250). Next, at Step 260, the latitude and longitude coordinates are received. Then, the latitude and longitude coordinates are stored in a memory on the mobile device (Step 270). Finally, at step 280, the latitude and longitude coordinates are associated with the geographic address in the database of contact records. The Yes output of decision 240, continues at step 280.

Figure 3:
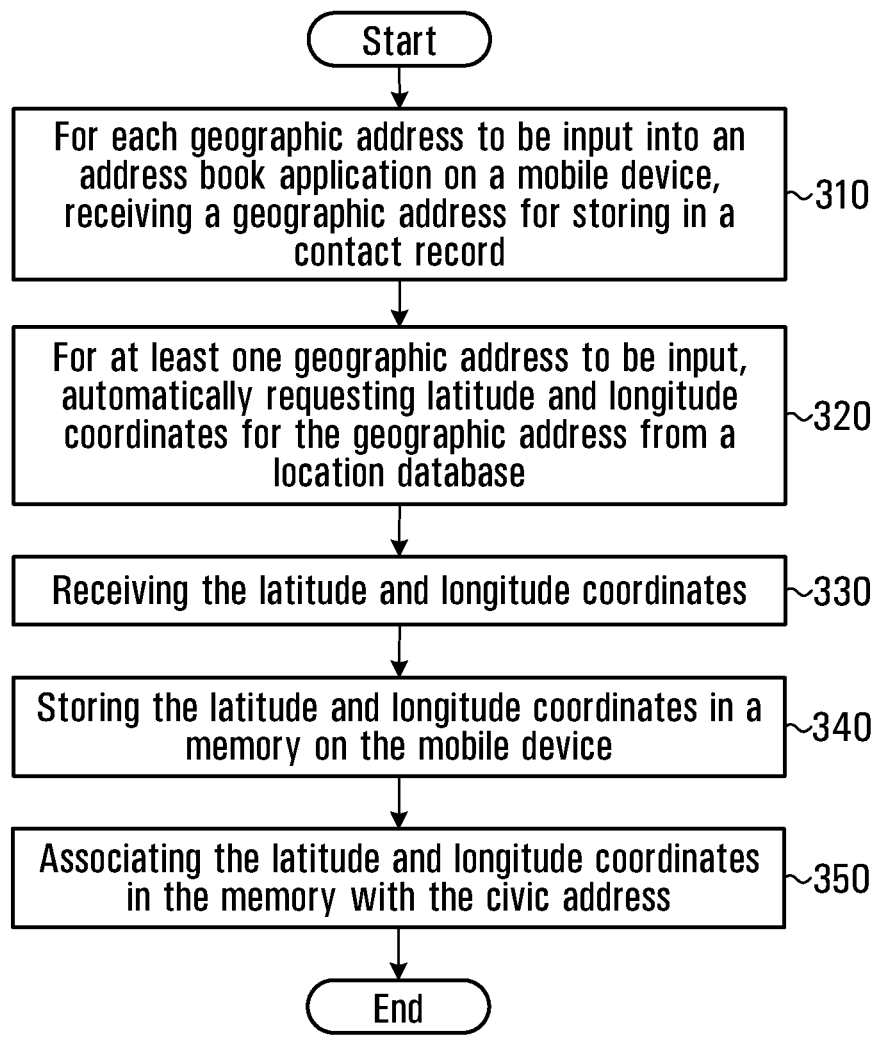
FIG. 3 is a flowchart of a method according to an aspect.

Another embodiments of a method will now be described with reference to FIG. 3. The method is performed in a mobile device. At step 310, for each geographic address to be input into an address book application on a mobile device, the geographic address is received for storing in a contact record.

At step 320, for at least one geographic address to be input, latitude and longitude coordinates for the geographic address are automatically requested from a location database. In some embodiments, the address book application has an option that can be selected by a user to automatically request longitude and latitude coordinates for each new geographic address entered. In some embodiments, this step comprises requesting the longitude and latitude coordinates from a location server over a wireless network. In other embodiments, the latitude and longitude coordinates are obtained from a database on the mobile device.

At step 330, the method continues with receiving the latitude and longitude coordinates for the at least one geographic address from the location database. In a non-limiting embodiment, if the geographic address is not found in the location database, the location server provides hints or suggestions to the mobile device for correcting the geographic address. In some embodiments, the mobile device displays these hints or suggestions to the user on a user interface and the user can select or provide a corrected address to input. The step of requesting the latitude and longitude can then be repeated and the receiving the latitude and longitude step is performed.

For example, in some embodiments where the location database is on a location server, the method further comprises receiving an indication from the location server that the geographic address is incorrect. Then, options for correcting the geographic address are presented on a display and an input from a user interface indicating a corrected address is received. Any contact record comprising the geographic address with the corrected address can then be updated. In some embodiments, the location server can include a merit value in its response providing suggested corrections. If the merit value is "absolute certainty", the address can be automatically updated if the address on the device differs from the one returned by the server. As mentioned above, some address card scanners automatically append default data such as "United States of America" to each address. For instance the address on the device could be something like "450 March Rd Ottawa Ontario Canada K2K 3K2 United States of America". The address returned by the server would be "450 March Rd Ottawa Ontario Canada K2K 3K2" with merit value of absolute certainty. In this case, the address on the device would be updated automatically.

Next, at step 340, the method continues with storing the latitude and longitude coordinates for the geographic address in a memory on the mobile device. In some embodiments, the latitude and the longitude are stored in the address book database. In a non-limiting example, the latitude and longitude coordinates are stored in the contact record for the geographic address. In some embodiments, the latitude and longitude coordinates are stored in a cache memory for use by a map application. It is to be understood that these embodiments are not mutually exclusive of each other and the latitude and longitude coordinates can be stored in more than one memory location on the mobile device.

Next, at step 350, the latitude and longitude coordinates are associated in the memory with the geographic address. For example, the coordinates may be cross-referenced to one or more contact records in a database. Alternatively, the coordinates may be cross-referenced to a geographic address that in turn is cross-referenced to one or more contact records.

In some embodiments, the contact record for the at least one contact is marked or tagged to indicate that the latitude and longitude coordinates are available on the mobile device. In some embodiments, a symbol is inserted into the contact record and when the contact record is displayed on a display, a symbol appears to indicate that the latitude and longitude coordinates are available. In other embodiments, when a user selects to view the geographic address for a contact on a map, the mobile device is configured to first check to see if the contact record is marked to indicate that the latitude and longitude coordinates are available on the mobile device. If the coordinates are available on the mobile device, the map application will use the coordinates stored in the memory on the mobile device. There is no requirement to request the coordinates from a location server, unless the contact record is not marked to indicate that the coordinates are available.

In some embodiments the method further comprises, for each contact to be input, searching existing contact records for the geographic address and if the latitude and longitude coordinates for the geographic address are in an existing contact record, cross-referencing the contact record for the contact to the existing record for accessing the latitude and longitude coordinates. Thus, in some implementations, latitude and longitude coordinates for an existing contact record with the same geographic address will be assigned to the new geographic address being entered. In this implementation, no request to the location server for latitude and longitude coordinates is necessary.

In some embodiments, the method further comprises a map application executing on the mobile device accessing the longitude and latitude coordinates stored in the memory. In an exemplary implementation, the method further comprises displaying the location of at least one of the geographic addresses on a map using a map application executed on the mobile device.

In some embodiments, the method further comprises identifying the contact record for the at least one contact as a point of interest (POI). In exemplary implementations, the method further comprises displaying, on a map on the mobile device, the geographic address from at least one contact record that is identified as a POI. Thus, the address book can be used as a source for latitude and longitude coordinates for displaying POIs on a map.

In still another embodiment, a user interface indicates that the mobile device is within a specified proximity of the geographic address of the at least one contact. Thus, the mobile device can compare its present location to at least one of the latitude and longitude coordinates stored in the memory on the mobile device on an ongoing or periodic basis and indicate when the mobile device is near a geographic address. In some embodiments, proximity to POIs is tracked. In other embodiments, contact records can be selected for the purpose of tracking proximity.

In some embodiments the method further comprises creating the contact record.

In some embodiments, the method further comprises requesting latitude and longitude coordinates or geo-coded data for a plurality of geographic addresses in the address book database. In this manner, latitude and longitude coordinates in the address book database that have no latitude and longitude coordinates stored on the mobile device can be batch-geocoded. Then, the results received from the location database can be stored on the mobile device for future use. As well, if the geographic addresses are received in a batch, for example in an address book update or batch transfer from another device, the entire batch can be geo-coded automatically.

It is to be understood that the embodiments of the methods described herein are exemplary implementations and are not mutually exclusive. Other implementations are possible that include portions of any of the described embodiments or other feasible features. The methods described herein are implemented, in some embodiments, by one or more tangible computer readable media having computer readable instructions stored thereon that when executed, implement the respective method. The methods can be implemented using hardware, software, firmware or combinations thereof.

Figure 4:
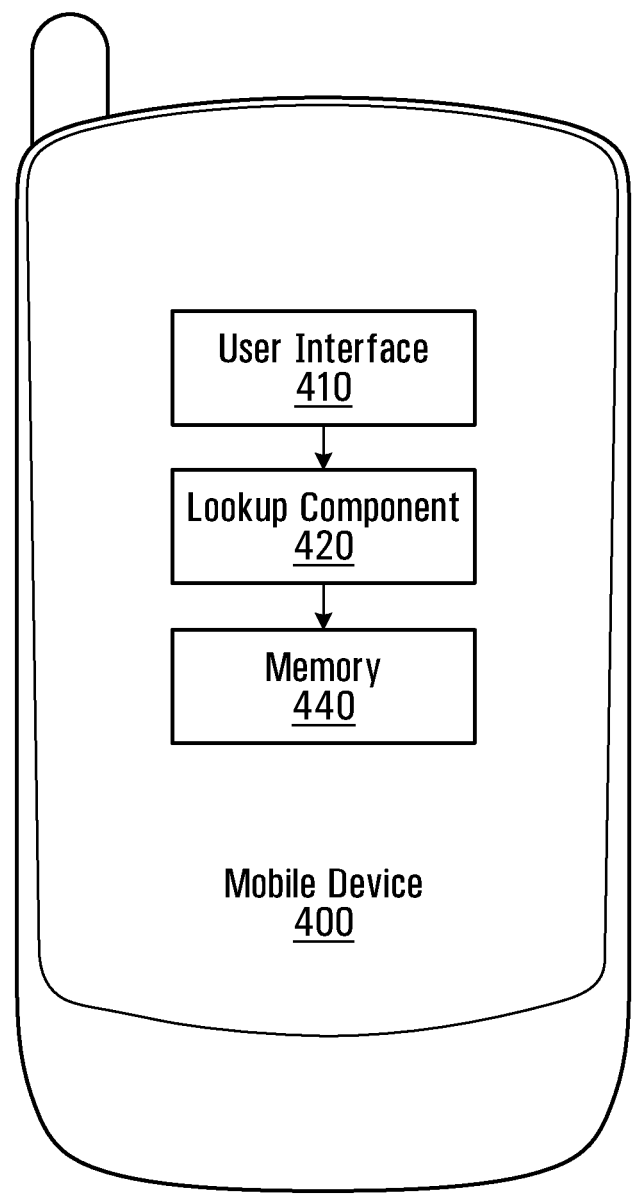
FIG. 4 is a block diagram of a mobile device according to one aspect.

Referring now to FIG. 4, an exemplary mobile device 400 will be described. The mobile device comprises a user interface 510, a lookup component 420, and a memory 440.

The user interface 410 is configured to receive a geographic address for storing in a contact record of a database of contact records on the mobile device. Exemplary implementations of the user interface 410 are a keyboard, non-keyboard buttons, a roller-wheel, a trackball, an optical trackball, a touch screen, an image scanning device, a voice activated input, an antenna for receiving data and a port for connecting to external devices.

The memory 240 is for storing the database. In some embodiments, the memory 240 also stores the address book database and the latitude and longitude coordinates are stored in the address book database. In some embodiments, the mobile device 400 further comprises a cache memory, for use by the map application, in which the longitude and latitude coordinates can be temporarily stored.

The look up component 420 configured to automatically determine the latitude and longitude coordinates for the geographic address upon receipt of the geographic address and associate the latitude and longitude coordinates with the geographic address in the database.

Figure 5:
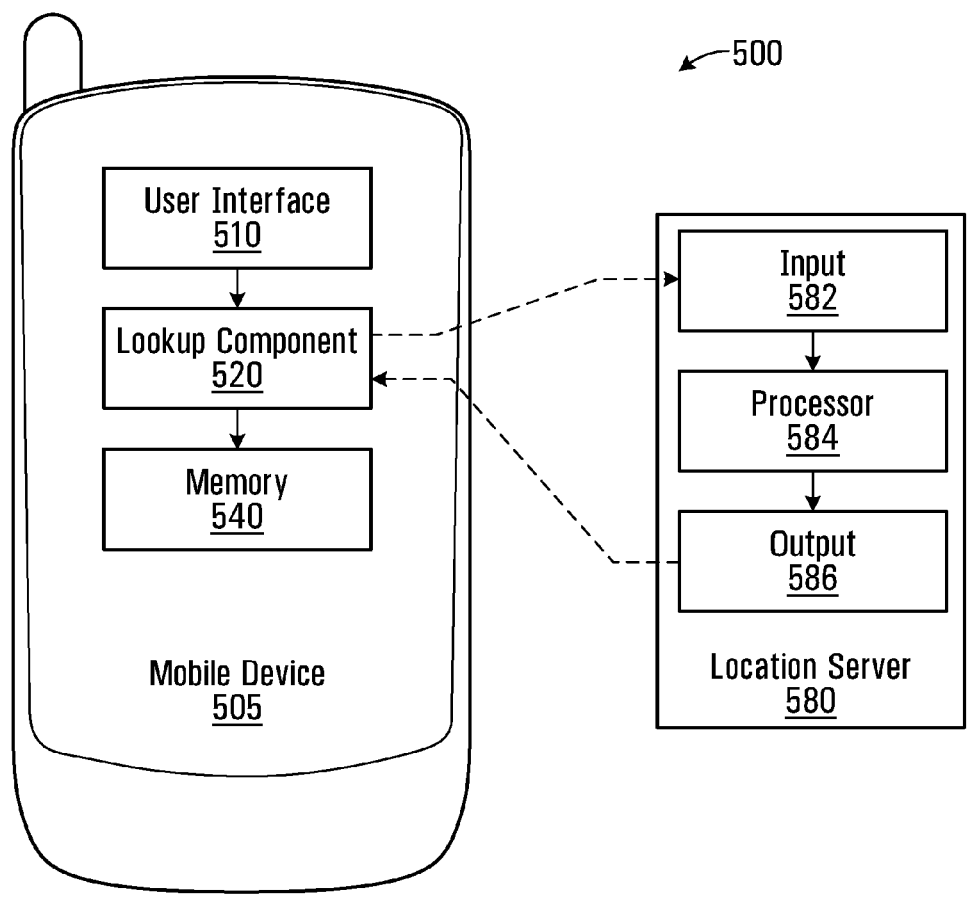
FIG. 5 is a block diagram of a system according to one aspect.

Referring now to FIG. 5, an exemplary system 500 according to an aspect will now be described. The system 500 comprises a mobile device 505 and a location server 580.

The mobile device 505 is similar in configuration and function to the mobile device 400 described with reference to FIG. 4 and comprises a user interface 510, a lookup component 520, and a memory 540.

The user interface 510 is configured in a similar manner to the interface 410 and is configured to receive a geographic address for storing in a contact record of a database of contact records on the mobile device.

The lookup component 520 is similar to the lookup component 420 is configured to communicate with the location server 580 to request and receive latitude and longitude coordinates for the geographic address from the location server 580 and associate the latitude and longitude coordinates in the memory with the geographic address.

The memory 540 is configured to store the latitude and longitude coordinates for the geographic address, The location server 580 comprises an input 582, a processor 584 and an output 586. The input 582 is configured to receive the request from the lookup component 520 of the mobile device 505. The processor 584 is configured to determine the latitude and longitude coordinates for the geographic address using a location database. In some embodiments, the location server 580 comprises the location database. The output 586 is configured to output the latitude and longitude coordinates to lookup component 520 of mobile device 505.

In some embodiments of the system 500, the location server 580 and the mobile device 505 communicate over a wireless network.

In some embodiments, the processor 584 of the location server 580 is configured to output suggestions for corrections to the geographic address if the geographic address is not recognized as valid by the processor.

Figure 6:
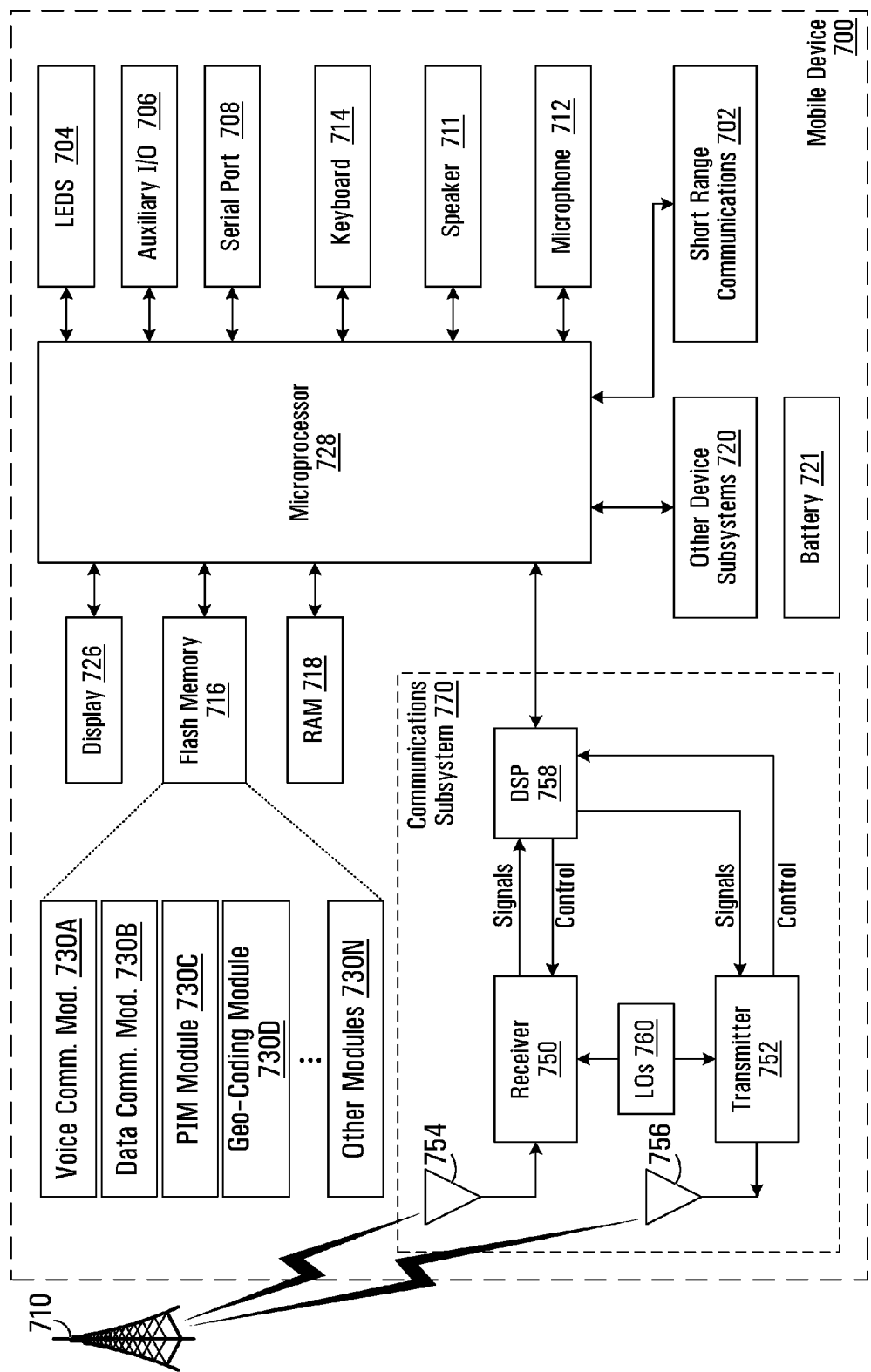
FIG. 6 is a block diagram of a mobile device on which the methods described herein may be executed.

Referring now to FIG. 6, shown is a block diagram of another mobile device 700 that may implement any of the methods described herein. It is to be understood that the mobile device 700 is shown with very specific details for example purposes only.

A processing device (a microprocessor 728) is shown schematically as coupled between a keyboard 714 and a display 726. The keyboard 714 and 726 are non-limiting examples of the user interfaces 410 and 510 described with reference to FIGS. 4 and 5, respectively. The microprocessor 728 controls operation of the display 726, as well as overall operation of the mobile device 700, in response to actuation of keys on the keyboard 714 by a user.

The mobile device 700 has a housing that may be elongated vertically, or may take on other sizes and shapes (including clamshell housing structures). The keyboard 714 may include a mode selection key, or other hardware or software for switching between text entry and telephony entry.

In addition to the microprocessor 728, other parts of the mobile device 700 are shown schematically. These include: a communications subsystem 770; a short-range communications subsystem 702; the keyboard 714 and the display 726, along with other input/output devices including a set of LEDS 704, a set of auxiliary I/O devices 706, a serial port 708, a speaker 711 and a microphone 712; as well as memory devices including a flash memory 716 and a Random Access Memory (RAM) 718; and various other device subsystems 720. The mobile device 700 may have a battery 721 to power the active elements of the mobile device 700. The mobile device 700 is in some embodiments a two-way radio frequency (RF) communication device having voice and data communication capabilities. In addition, the mobile device 700 in some embodiments has the capability to communicate with other computer systems via the Internet.

Operating system software executed by the microprocessor 728 is in some embodiments stored in a persistent store, such as the flash memory 716, but may be stored in other types of memory devices, such as a read only memory (ROM) or similar storage element. In addition, system software, specific device applications, or parts thereof, may be temporarily loaded into a volatile store, such as the RAM 718. Communication signals received by the mobile device 700 may also be stored to the RAM 718.

The microprocessor 728, in addition to its operating system functions, enables execution of software applications on the mobile device 700. A predetermined set of software applications that control basic device operations, such as a voice communications module 730A and a data communications module 730B, may be installed on the mobile device 700 during manufacture. In addition, a personal information manager (PIM) application module 730C may also be installed on the mobile device 700 during manufacture. The PIM application is in some embodiments capable of organizing and managing data items, such as e-mail, calendar events, voice mails, appointments, and task items. The PIM application is also in some embodiments capable of sending and receiving data items via a wireless network 710. In some embodiments, the data items managed by the PIM application are seamlessly integrated, synchronized and updated via the wireless network 710 with the device user's corresponding data items stored or associated with a host computer system.

In addition, a software application to perform a geo-coding function 730D may be installed. The geo-coding function 730D may implement any of the methods described herein for automatically requesting latitude and longitude coordinates for a geographic address input into an address book application on the mobile device 700.

As well, additional software modules, illustrated as another software module 730N, may be installed during manufacture.

Communication functions, including data and voice communications, are performed through the communication subsystem 770, and possibly through the short-range communications subsystem 702. The communication subsystem 770 includes a receiver 750, a transmitter 752 and one or more antennas, illustrated as a receive antenna 754 and a transmit antenna 756. In addition, the communication subsystem 770 also includes a processing module, such as a digital signal processor (DSP) 758, and local oscillators (LOs) 760. The specific design and implementation of the communication subsystem 770 is dependent upon the communication network in which the mobile device 700 is intended to operate. For example, the communication subsystem 770 of the mobile device 700 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access CDMA, Personal Communications Service (PCS), Global System for Mobile Communications (GSM), etc. Other types of data and voice networks, both separate and integrated, may also be utilized with the mobile device 700.

Network access requirements vary depending upon the type of communication system. For example, in the Mobitex™ and DataTAC™ networks, mobile devices are registered on the network using a unique Personal Identification Number (PIN) associated with each device. In GPRS networks, however, network access is associated with a subscriber or user of a device. A GPRS device therefore requires a subscriber identity module, commonly referred to as a Subscriber Identity Module (SIM) card, in order to operate on a GPRS network.

When required network registration or activation procedures have been completed, the mobile device 700 may send and receive communication signals over the communication network 710. Signals received from the communication network 710 by the receive antenna 754 are routed to the receiver 750, which provides for signal amplification, frequency down conversion, filtering, channel selection, etc., and may also provide analog to digital conversion. Analog-to-digital conversion of the received signal allows the DSP 758 to perform more complex communication functions, such as demodulation and decoding. In a similar manner, signals to be transmitted to the network 710 are processed (e.g., modulated and encoded) by the DSP 758 and are then provided to the transmitter 752 for digital to analog conversion, frequency up conversion, filtering, amplification and transmission to the communication network 710 (or networks) via the transmit antenna 756.

In addition to processing communication signals, the DSP 758 provides for control of the receiver 750 and the transmitter 752. For example, gains applied to communication signals in the receiver 750 and the transmitter 752 may be adaptively controlled through automatic gain control algorithms implemented in the DSP 758.

In a data communication mode, a received signal, such as a text message or web page download, is processed by the communication subsystem 770 and is input to the microprocessor 728. The received signal is then further processed by the microprocessor 728 for an output to the display 726, or alternatively to some other auxiliary I/O devices 706. A device user may also compose data items, such as e-mail messages, using the keyboard 714 and/or some other auxiliary I/O device 706, such as a touchpad, a rocker switch, a thumb-wheel, or some other type of input device. The composed data items may then be transmitted over the communication network 710 via the communication subsystem 770.

In a voice communication mode, overall operation of the device is substantially similar to the data communication mode, except that received signals are output to a speaker 711, and signals for transmission are generated by a microphone 712. Alternative voice or audio I/O subsystems, such as a voice message recording subsystem, may also be implemented on the device 700. In addition, the display 726 may also be utilized in voice communication mode, for example, to display the identity of a calling party, the duration of a voice call, or other voice call related information.

The short-range communications subsystem 702 enables communication between the mobile device 700 and other proximate systems or devices, which need not necessarily be similar devices. For example, the short-range communications subsystem may include an infrared device and associated circuits and components, or a Bluetooth™ communication module to provide for communication with similarly-enabled systems and devices.

What has been described is merely illustrative of the application of the principles of methods, modules and devices described herein. Other arrangements and methods can be implemented by those skilled in the art without departing from the spirit and scope of the embodiments.

The invention claimed is:

1. A method, in a mobile device, the method comprising:
  receiving a non-geocoded geographic address for storing in a contact record of a database of contact records on the mobile device;
  automatically and without user initiation determining latitude and longitude coordinates for the geographic address, wherein determining the latitude and longitude coordinates comprises requesting the longitude and latitude coordinates from a location server over a wireless network; and
  in the database, associating the latitude and longitude coordinates with the geographic address,
  wherein determining the latitude and longitude coordinates further comprises;
    receiving a suggestion for corrections to the geographic address from the location server if the geographic address is not recognized as valid by the location server;
    receiving a merit value along with the suggestion for corrections, the merit value indicating a likelihood that the suggestion is accurate; and
    automatically updating the geographic address based on the suggestion if the merit value indicates a certain accuracy.

2. The method of claim 1, further comprising storing the latitude and longitude coordinates for the geographic address in the database.

3. The method of claim 1, wherein determining the latitude and longitude coordinates comprises requesting the latitude and longitude coordinates from a location database.

4. The method of claim 1, wherein determining the latitude and longitude coordinates comprises first searching existing contact records in the database of contact records for the geographic address and if the latitude and longitude coordinates for the geographic address are in an existing contact record, cross-referencing the contact record to the existing contact record for accessing the latitude and longitude coordinates.

5. The method of claim 1, further comprising displaying a location the geographic address on a map using a map application executing on the mobile device.

6. The method of claim 1, further comprising identifying the geographic address as a point of interest (POI).

7. The method of claim 1, further comprising producing a user perceptible alert to indicate that the mobile device is within a specified proximity of the geographic address.

8. The method of claim 2, wherein storing the latitude and longitude coordinates in the memory comprises storing the latitude and the longitude in the contact record for the geographic address.

9. The method of claim 1, further comprising a map application on the mobile device accessing the longitude and latitude coordinates from the database of contact records.

10. The method of claim 1, further comprising storing the latitude and longitude coordinates in a cache memory on the mobile device for use by a map application on the mobile device.

11. The method of claim 1, further comprising adding the contact record to the database of contact records.

12. The method of claim 1, further comprising requesting latitude and longitude coordinates for a plurality of geographic addresses in the database of contact records.

13. The method of claim 1, further comprising receiving an indication from a location server that the geographic address is incorrect, presenting a user interface providing user input options for correcting the geographic address, receiving an input from the user interface indicating a corrected address and updating any contact record comprising the geographic address with the corrected address.

14. A mobile device comprising:
    a user interface configured to receive a non-geocoded geographic address for storing in a contact record of a database of contact records on the mobile device;
    a memory for storing the database;
    a look up component configured to automatically determine latitude and longitude coordinates for the geographic address upon receipt of the geographic address and associate the latitude and longitude coordinates with the geographic address in the database;
    wherein determining the latitude and longitude coordinates comprises;
        requesting the longitude and latitude coordinates from a location server over a wireless network;
        receiving a suggestion for corrections to the geographic address from the location server if the geographic address is not recognized as valid by the location server;
        receiving a merit value along with the suggestion for corrections, the merit value indicating a likelihood that the suggestion is accurate; and
        automatically updating the geographic address based on the suggestion if the merit value indicates a certain accuracy.

15. The mobile device of claim 14, wherein the user interface is a receiver for receiving communications over a wireless network.

16. The mobile device of claim 14, further comprising a cache memory for use by a map application in which the latitude and longitude coordinates can be temporarily stored.

17. A system comprising a mobile device and a location server,
    the mobile device comprising:
        a user interface configured to receive a non-geocoded geographic address for storing in a contact record of a database of contact records on the mobile device;
        a lookup component configured to communicate with the location server to request and receive latitude and longitude coordinates for the geographic address from the location server; and
        a memory configured to store the latitude and longitude coordinates for the geographic address,
        wherein the lookup component is configured to:
            associate the latitude and longitude coordinates in the memory with the geographic address;
            receive a merit value along with the suggestion for corrections, the merit value indicating a likelihood that the suggestion is accurate; and
            automatically update the geographic address based on the suggestion if the merit value indicates a certain accuracy;
    and the location server comprising:
        an input configured to receive the request from the lookup component;
        a processor configured to determine the latitude and longitude coordinates for the geographic address using a location database, and to output a suggestion for corrections to the geographic address if the geographic address is not recognized as valid by the processor;
        an output configured to output the latitude and longitude coordinates to the lookup component;
    wherein the location server and the mobile device communicate over a wireless network.

* * * * *

UNITED STATES PATENT AND TRADEMARK OFFICE
CERTIFICATE OF CORRECTION

| | | |
|---|---|---|
| PATENT NO. | : 8,850,341 B2 | Page 1 of 1 |
| APPLICATION NO. | : 12/511418 | |
| DATED | : September 30, 2014 | |
| INVENTOR(S) | : Ngoc Bich Ngo et al. | |

It is certified that error appears in the above-identified patent and that said Letters Patent is hereby corrected as shown below:

In the specification:

Column 7, Line 34, "...longitude coordinates for the geographic address," should be --...longitude coordinates for the geographic address.--

In the claims:

Column 10, Claim 1, Lines 27 & 28, "...coordinates further comprises;" should be --...coordinates further comprises:--

Column 11, Claim 14, Lines 28 & 29, "...coordinates comprises;" should be --...coordinates comprises:--

Signed and Sealed this
Tenth Day of March, 2015

Michelle K. Lee
*Deputy Director of the United States Patent and Trademark Office*